United States Patent
Satou

(10) Patent No.: US 7,680,106 B2
(45) Date of Patent: Mar. 16, 2010

(54) SUBSCRIBER LINE ACCOMMODATION APPARATUS AND PACKET FILTERING METHOD

(75) Inventor: Sou Satou, Tokyo (JP)

(73) Assignee: NEC Corporation, Tokyo (JP)

( * ) Notice: Subject to any disclaimer, the term of this patent is extended or adjusted under 35 U.S.C. 154(b) by 1129 days.

(21) Appl. No.: 11/231,827

(22) Filed: Sep. 22, 2005

(65) Prior Publication Data

US 2006/0067321 A1    Mar. 30, 2006

(30) Foreign Application Priority Data

Sep. 27, 2004    (JP) .............................. 2004-280486

(51) Int. Cl.
*H04L 12/56* (2006.01)
(52) U.S. Cl. ...................................... 370/389
(58) Field of Classification Search ................. 370/401, 370/389
See application file for complete search history.

(56) References Cited

U.S. PATENT DOCUMENTS

| 5,204,858 | A | | 4/1993 | Kinashi et al. | |
|---|---|---|---|---|---|
| 5,740,375 | A | * | 4/1998 | Dunne et al. ................. | 709/238 |
| 6,466,571 | B1 | * | 10/2002 | Dynarski et al. ............. | 370/352 |
| 6,487,605 | B1 | * | 11/2002 | Leung .......................... | 709/245 |
| 6,661,780 | B2 | * | 12/2003 | Li ................................ | 370/324 |
| 6,988,148 | B1 | * | 1/2006 | Sheth .......................... | 709/245 |
| 7,054,323 | B2 | * | 5/2006 | Viola et al. .................. | 370/401 |
| 7,124,197 | B2 | * | 10/2006 | Ocepek et al. .............. | 709/232 |
| 7,174,376 | B1 | * | 2/2007 | Daruwalla ................... | 709/223 |
| 7,275,113 | B1 | * | 9/2007 | Araujo ........................ | 709/245 |
| 7,295,566 | B1 | * | 11/2007 | Chiu et al. ................... | 370/419 |
| 7,324,515 | B1 | * | 1/2008 | Chapman ..................... | 370/392 |
| 2003/0118038 | A1 | | 6/2003 | Jalava et al. ................. | 370/401 |
| 2003/0131133 | A1 | * | 7/2003 | Nyu et al. .................... | 709/245 |

(Continued)

FOREIGN PATENT DOCUMENTS

JP    10-290444    10/1998

(Continued)

OTHER PUBLICATIONS

An Office Action issued by the Korean Patent Office issued on Nov. 17, 2006, in Korean, Japanese and English languages, pp. 1-6.

(Continued)

*Primary Examiner*—Derrick W Ferris
*Assistant Examiner*—Mang Yeung
(74) *Attorney, Agent, or Firm*—Whitham Curtis Christofferson & Cook, PC

(57) ABSTRACT

In a subscriber line accommodation apparatus, subscriber line termination units individually terminate a plurality of subscriber lines. An address information acquisition unit successively acquires, as address information, a dynamic address dynamically assigned to each of the communication terminals connected to the subscriber lines terminated by the subscriber line termination unit. A packet information reading unit reads out, from a packet to be sent to one of the communication terminals, packet information containing a dynamic address indicating the destination of the packet. An address information coincidence presence/absence determination unit determines whether the readout dynamic address coincides with one of the pieces of address information acquired by the address information acquisition unit. A packet sending control unit permits sending of only a packet determined to be coincident. A packet filtering method is also disclosed.

14 Claims, 7 Drawing Sheets

U.S. PATENT DOCUMENTS

| | | | |
|---|---|---|---|
| 2004/0017814 A1* | 1/2004 | Shimada | 370/395.52 |
| 2004/0090970 A1* | 5/2004 | Sanchez et al. | 370/397 |
| 2005/0265398 A1* | 12/2005 | Chapman et al. | 370/509 |
| 2006/0067321 A1* | 3/2006 | Satou | 370/392 |

FOREIGN PATENT DOCUMENTS

| | | |
|---|---|---|
| JP | 2002-204246 A | 7/2002 |
| KR | 1999-0061606 | 7/1999 |
| WO | WO 03/034687 A1 | 4/2003 |
| WO | WO 2004/025472 | 3/2004 |

OTHER PUBLICATIONS

Cisco-Cable Source-Verify and IP Address Security (http://www.cisco.com/warp/public/109Source_verify.html).

The Office Action issued by the Canadian Patent Office in relation to the related Canadian application on Jun. 18, 2008, pp. 1 to 3.

The Office Action issued by the Chinese Patent Office on Aug. 8, 2008, with English language trnaslation, pp. 1 to 13.

"Cable Modem", Journal of Weigeng University, Jul. 31, 2003, pp. 1 to 3.

Japanese Office Action with English Translations.

Canadian Office Action.

* cited by examiner

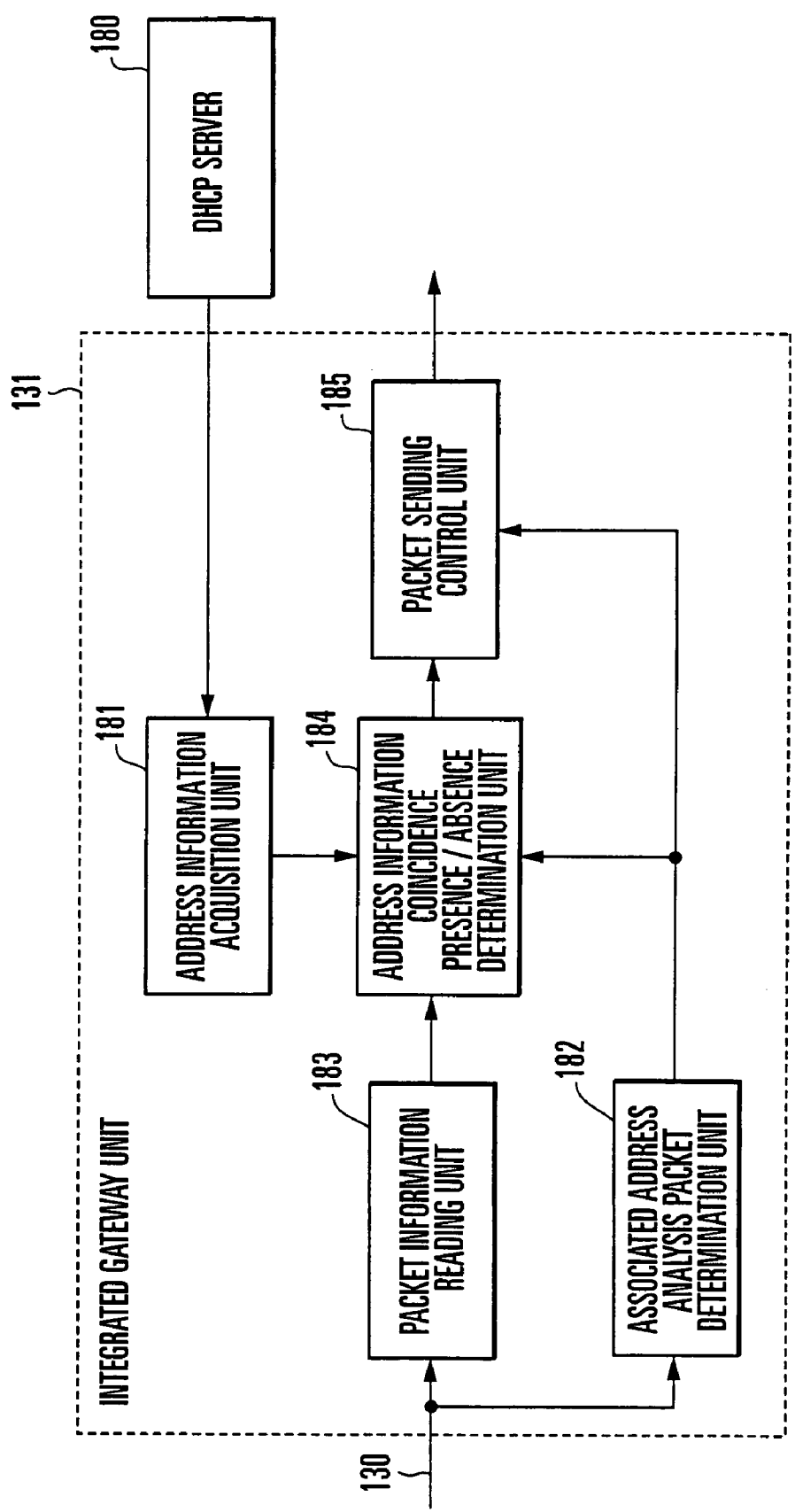

SUBSCRIBER LINE ACCOMMODATION APPARATUS AND PACKET FILTERING METHOD

BACKGROUND OF THE INVENTION

The present invention relates to a subscriber line accommodation apparatus which is used to send a packet to a communication terminal connected to a subscriber line terminated by a subscriber line termination unit and a packet filtering method used in sending a packet.

There is widely employed a service form in which DHCP (Dynamic Host Configuration Protocol) is used by each user terminal to connect to a communication network such as the Internet through a transmission line such as a telephone line or an optical cable. The DHCP indicates a protocol to dynamically assign a reusable IP (Internet Protocol) address.

In a communication network using DHCP, however, a third party can interfere with communication of another person or impose as another person by assuming a false IP address or MAC (Media Access Control) address.

For example, when the bridge forwarder of a subscriber line termination unit included in a communication network using DHCP has received packets to be subjected to flooding, the packets are transmitted to all nodes present on the same network. For this reason, unnecessary packets are transmitted to even a user terminal which is no communication target, and the traffic increases.

Additionally, in the communication network using DHCP, an IP address is dynamically assigned to each user terminal. Hence, it is impossible to exclude unnecessary packets by registering a static filter in advance.

A subscriber line accommodation apparatus has been proposed in which all MAC addresses of user terminals connected to accommodated lines are registered. When a communication terminal different from these MAC addresses is going to access the network, the access is rejected, thereby increasing the security level (e.g., reference 1 (Japanese Patent Laid-Open No. 2002-204246)).

In the first proposal, a third party can interfere with communication of another person or impose as another person by assuming a false IP address.

To solve this problem, a subscriber line accommodation apparatus capable of rejecting an access request from a third party for a communication network by using an IP packet has been proposed (see, for example, reference 2 (Cisco-Cable Source-Verify and IP Address Security (http://www.cisco.com/warp/public/109/source_verify.html))).

In the second proposal, when an IP packet arrives at a DHCP server to request acquisition of an IP address, an IP address is issued in response to the request. In addition, a set of the issued IP address, the identification number of the subscriber line for which IP address acquisition is requested, and the MAC address of the communication terminal which has issued the request is registered in a filter condition registration means. When a packet has arrived, a set of the IP address, identification number, MAC address of the packet transmission source and the set of the IP address, identification number, MAC address registered in the filter condition registration means are compared. Only when the two sets coincide, packet communication is permitted. Communication is not permitted for a packet in which address information such as the IP address of the transmission source coincides but the identification number of the subscriber line does not coincide. Hence, illicit access can effectively be prevented.

However, the second proposal only regulates packet input by using an input filter and cannot regulate output of unnecessary data. Hence, packets sent to a communication terminal connected to a subscriber line cannot be filtered efficiently.

SUMMARY OF THE INVENTION

It is an object of the present invention to provide a subscriber line accommodation apparatus and packet filtering method capable of efficiently filtering packets sent to a communication terminal connected to a subscriber line.

In order to achieve the above object, according to the present invention, there is provided a subscriber line accommodation apparatus comprising subscriber line termination units which individually terminate a plurality of subscriber lines, an address information acquisition unit which successively acquires, as address information, a dynamic address dynamically assigned to each of communication terminals connected to the subscriber lines terminated by the subscriber line termination unit, a packet information reading unit which reads out, from a packet to be sent to one of the communication terminals, packet information containing a dynamic address indicating a destination of the packet, an address information coincidence presence/absence determination unit which determines whether the dynamic address read out by the packet information reading unit coincides with one of the address information acquired by the address information acquisition unit, and a packet sending control unit which permits sending of only a packet determined to be coincident by the address information coincidence presence/absence determination unit.

There is also provided a packet filtering method comprising the steps of reading out, from a packet to be sent to one of communication terminals connected to subscriber line termination units which individually terminate a plurality of subscriber lines, packet information containing a dynamic address indicating a destination of the packet, determining whether the readout dynamic address coincides with one of dynamic addresses as addresses dynamically assigned to the communication terminals connected to the subscriber line termination units, and permitting sending of only a packet determined to be coincident.

BRIEF DESCRIPTION OF THE DRAWINGS

FIG. 9 is a conceptual diagram of main parts of the subscriber line accommodation apparatus.

DESCRIPTION OF THE PREFERRED EMBODIMENT

An embodiment of the present invention will be described below in detail with reference to the accompanying drawings.

<Outline of System>

Figure 1:
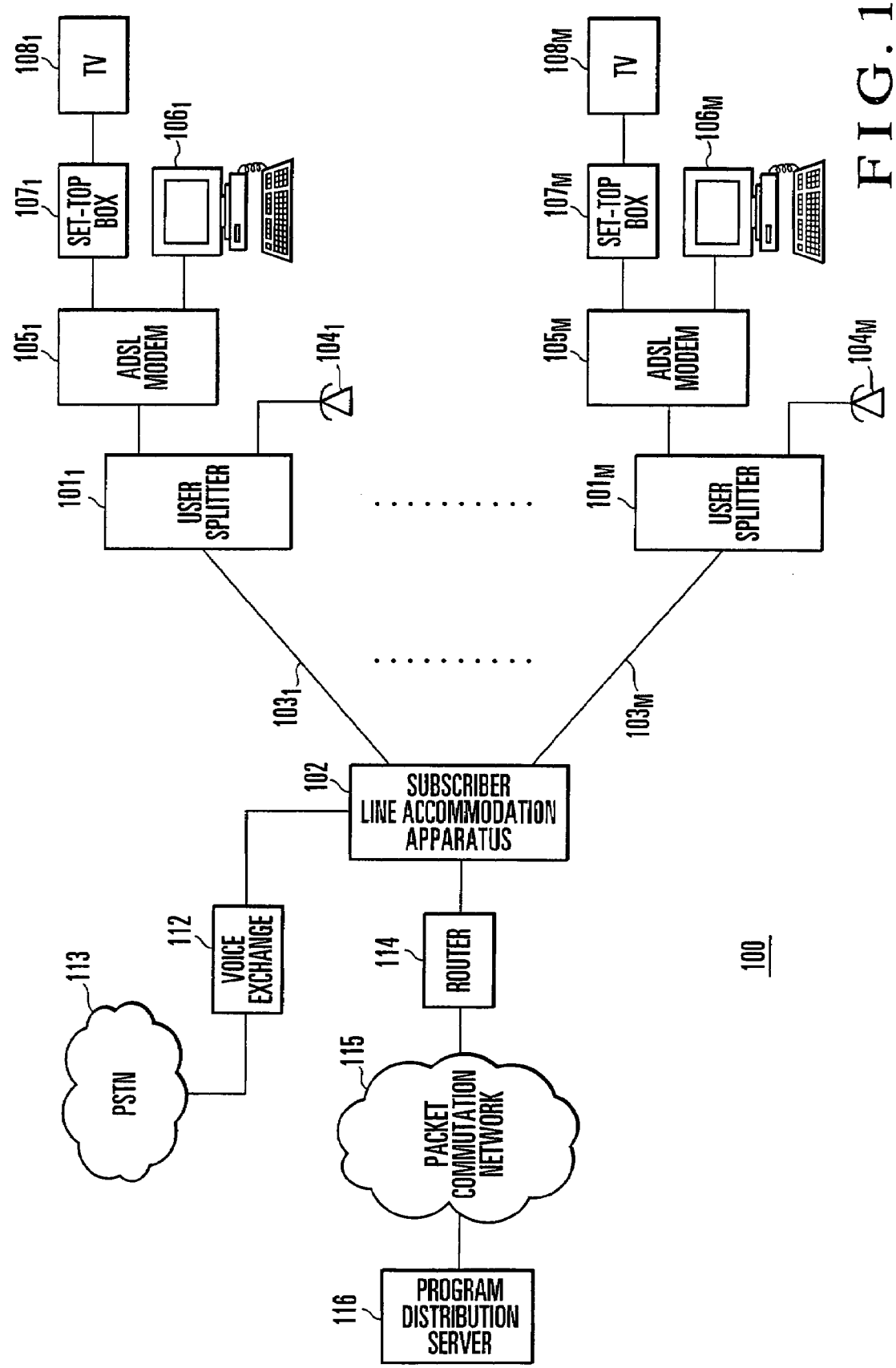
FIG. 1 is a view showing the outline of the configuration of a multicast information distribution system to watch TV pictures.

FIG. 1 shows the outline of a multicast information distribution system using a subscriber line accommodation apparatus of this embodiment. A multicast information distribution system 100 uses an asymmetric digital subscriber line called ADSL. The multicast information distribution system 100 connects user splitters $101_1$ to $101_M$ arranged in subscribers' homes to a subscriber line accommodation apparatus 102 by DSL subscriber lines $103_1$ to 103M. Each of the user splitters $101_1$ to $101_M$ is connected to a corresponding one of telephone sets $104_1$ to $104_M$ and a corresponding one of ADSL modems $105_1$ to $105_M$. Personal computers $106_1$ to $106_M$ to execute various kinds of data processing such as homepage browsing are connected to the ADSL modems $105_1$ to $105_M$, respectively. In addition, Internet televisions (TVs) $108_1$ to $108_M$ to see TV programs are connected to the ADSL modems $105_1$ to $105_M$ through set-top boxes $107_1$ to $107_M$, respectively.

The subscriber line accommodation apparatus 102 is connected to a voice exchange 112 and thus connected to a PSTN (Public Switched Telephone Network) 113. The subscriber line accommodation apparatus 102 is also connected to a packet commutation network 115 such as the Internet to execute packet commutation through a router 114. A program distribution server 116 to distribute various kinds of TV programs to the Internet televisions 108 of the users is connected to the packet commutation network 115.

Figure 2:
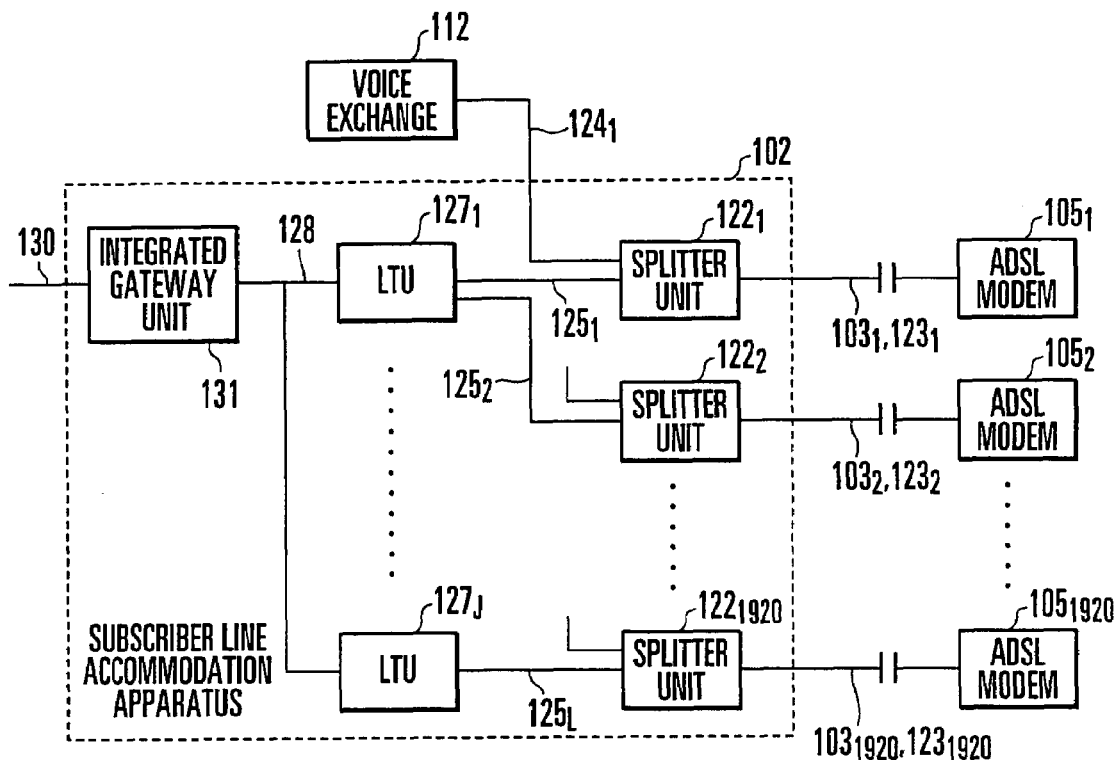
FIG. 2 is a block diagram showing the outline of a subscriber line accommodation apparatus and peripheral circuit configurations.

FIG. 2 shows the configuration of the subscriber line accommodation apparatus 102 and its periphery. The subscriber line accommodation apparatus 102 can accommodate 1,920 lines per system at maximum.

The subscriber line accommodation apparatus 102 comprises splitter units $122_1$ to $122_{1920}$ connected to the ADSL modems $105_1$ to $105_{1920}$ through the DSL subscriber lines $103_1$ to $103_{1920}$, DSL subscriber line termination units (LTUs) $127_1$ to $127_J$ serving as subscriber line termination units to individually terminate the DSL subscriber lines $103_1$ to $103_{1920}$, and an integrated gateway unit 131. The splitter unit $122_1$ and DSL subscriber line termination unit $127_1$ will be described below representatively.

The splitter unit $122_1$ splits a signal 123 sent through the DSL subscriber line $103_1$ into a telephone signal $124_1$ in the voice frequency band and an ADSL signal $125_1$ in a predetermined frequency band higher than the voice frequency band. The telephone signal $124_1$ is sent to the voice exchange 112 for line switching. The ADSL signal $125_1$ split by the splitter unit $122_1$ is modulated/demodulated by the initial stage (not shown) of the corresponding DSL subscriber line termination unit $127_1$ to extract an ATM cell. The ATM cell is input to the integrated gateway unit (IGU) 131 through a backplane bus 128. The integrated gateway unit 131 will be described later in detail.

The DSL subscriber line termination unit $127_1$ comprises a DSL transceiver module (DSP (Digital Signal Processor)) corresponding to a predetermined number of lines, for example, 32 lines at maximum. The DSL subscriber line termination unit $127_1$ executes high-speed data communication in the up-link direction (the direction of the packet commutation network 115 in FIG. 1) through an up-link line 130 serving as an interface to connect to the Internet by using the DSL subscriber lines $103_1$ to $103_{1920}$. The DSL subscriber line termination unit $127_1$ also receives and modulates down link data and sends it to the DSL subscriber lines $103_1$ to $103_{1920}$.

Figure 3:
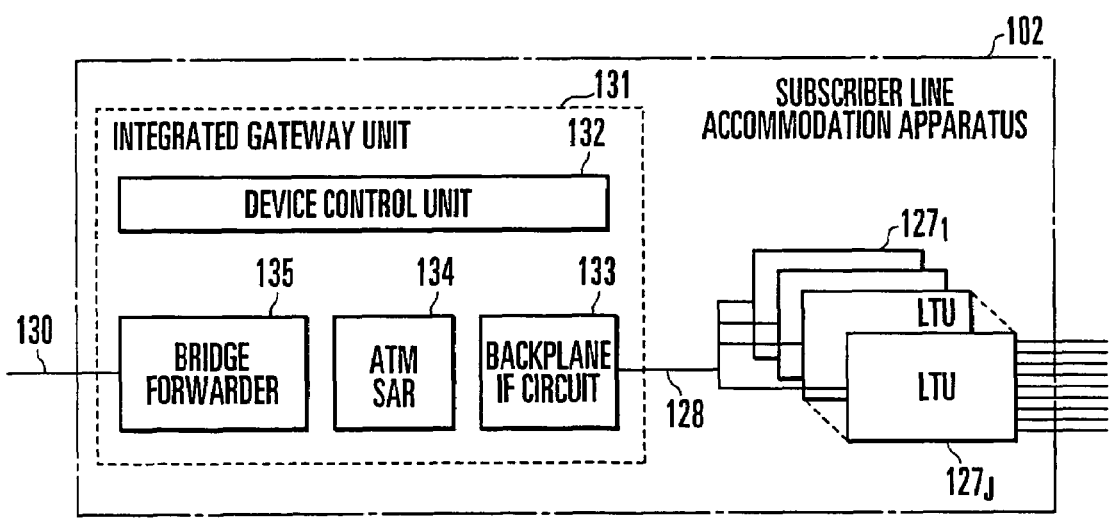
FIG. 3 is a block diagram showing the system configuration of main parts of the subscriber line accommodation apparatus.

FIG. 3 shows the system configuration of main parts of the subscriber line accommodation apparatus 102. The subscriber line accommodation apparatus 102 comprises the DSL subscriber line termination units (LTUs) $127_1$ to $127_J$ described in FIG. 2. The DSL subscriber line termination units $127_1$ to $127_J$ are connected to one terminal of the integrated gateway unit 131. The integrated gateway unit 131 has an interface function to connect to the Internet. The up-link line 130 is connected to the other terminal of the integrated gateway unit 131.

The integrated gateway unit 131 comprises a device control unit 132 which controls and monitors the entire subscriber line accommodation apparatus 102, a backplane IF (interface) circuit 133 serving as the interface of the backplane, an ATM SAR (Asynchronous Transfer Mode Segmentation And Reassembly) 134 which assembles or segments an ATM (Asynchronous Transfer Mode) cell, and a bridge forwarder 135 which forward layer 2 and sorts packets on the basis of a MAC address (Media Access Control address). An ATM cell is transmitted between the ATM SAR 134 and the DSL subscriber line termination units $127_1$ to $127_J$. An Ethernet (registered trademark) frame is transmitted at the input/output portion of the up-link line 130.

Figure 4:
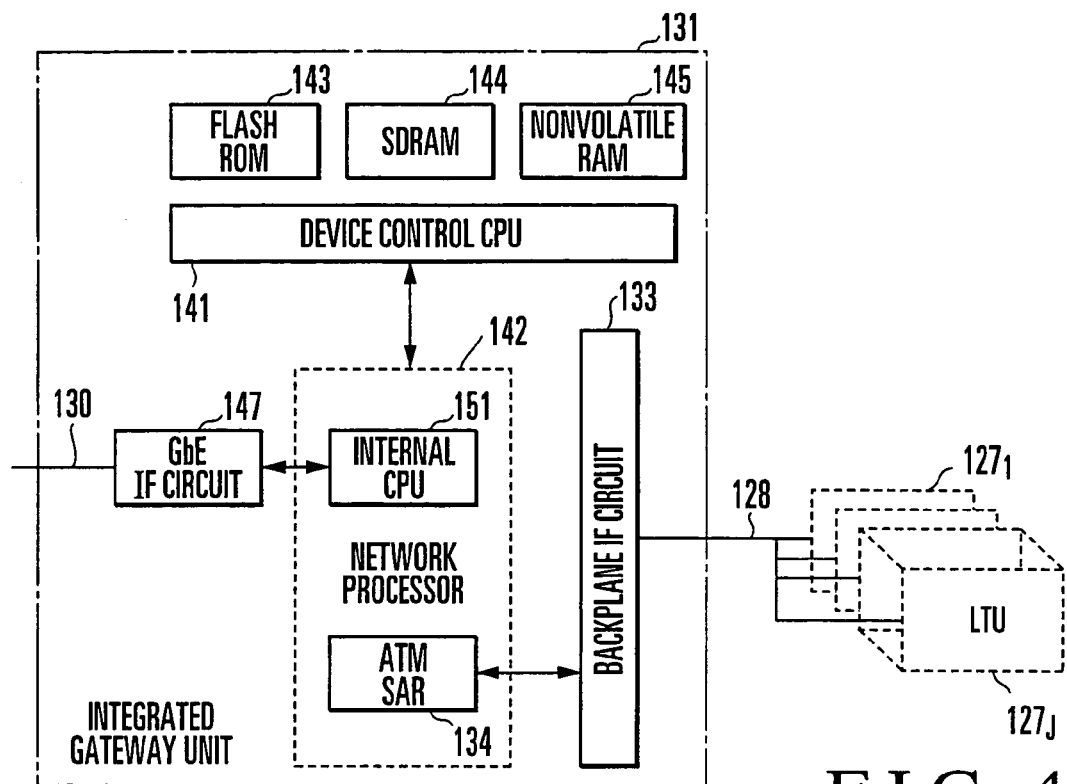
FIG. 4 is a block diagram showing the outline of the hardware configuration of an integrated gateway unit.

FIG. 4 shows the outline of the circuit configuration of the hardware of the integrated gateway unit 131. The integrated gateway unit 131 comprises two processors, i.e., a device control CPU (Central Processing Unit) 141 and a network processor 142, a memory group including a flash ROM (Read Only Memory) 143, an SDRAM (Synchronous Dynamic Random Access Memory) 144, and a nonvolatile RAM (Random Access Memory) 145, the backplane IF circuit 133 including an ASIC (Application Specific Integrated Circuit) serving as an integrated circuit for a specific application purpose, and a GbE (Gigabit Ethernet (registered trademark)) IF (interface) circuit 147 including an LSI (Large Scale Integration) (not shown).

The device control CPU 141 executes control related to device management, communication, or configuration setting. The network processor 142 is a high-speed communication processor having an internal CPU 151 and the ATM SAR 134. The bridge forwarder 135 shown in FIG. 3 is implemented as software by using the network processor 142 so that processes such as frame reception, destination determination, and transmission to the destination are executed by the bridge forwarder 135. The backplane IF circuit 133 implements, as hardware, various kinds of control related to the lines such as bus control to the lines to execute high-speed processing of a frame sent for each gigabit. The backplane IF circuit 133 processes the DSL subscriber line termination units $127_1$ to $127_J$ individually by polling.

Figure 5:
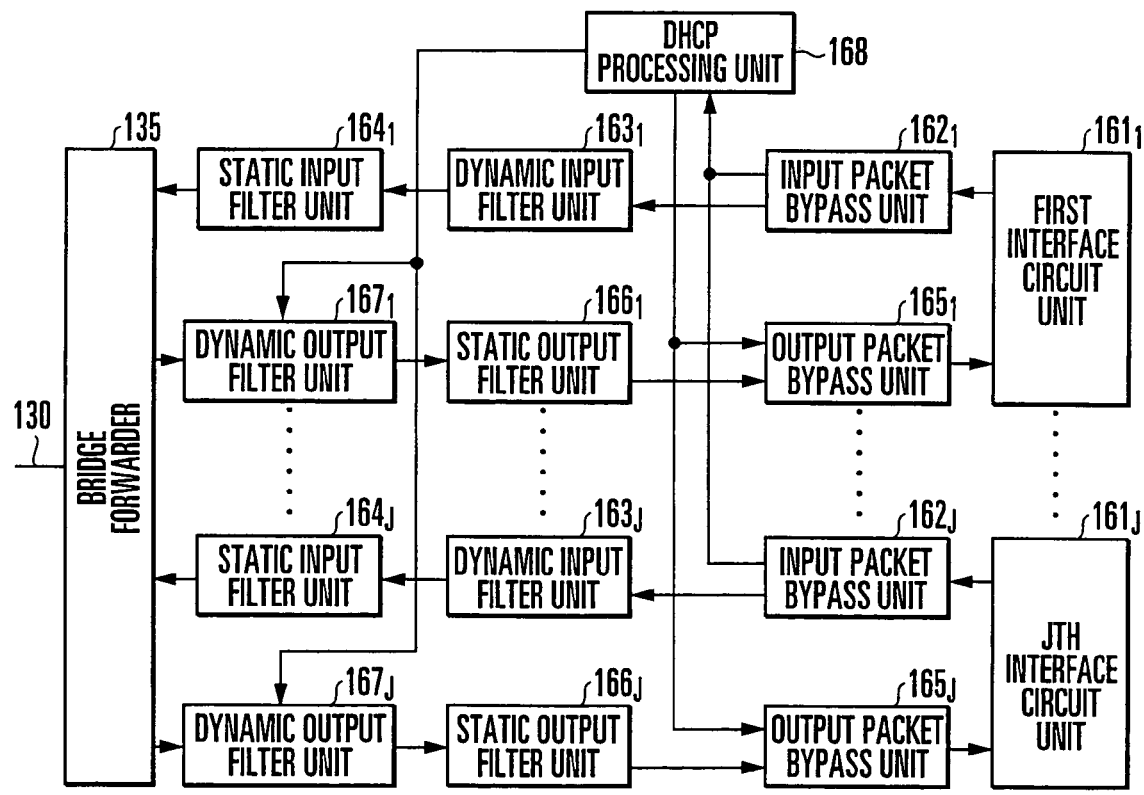
FIG. 5 is a block diagram showing the main functional blocks of the integrated gateway unit.

FIG. 5 shows the main functional blocks of the integrated gateway unit 131. The integrated gateway unit 131 comprises first to Jth interface circuit units $161_1$ to $161_J$ arranged in correspondence with the DSL subscriber line termination units $127_1$ to $127_J$ shown in FIG. 2. Between the bridge forwarder 135 and the first to Jth interface circuit units $161_1$ to $161_J$, series circuits including input packet bypass units $162_1$ to $162_J$, dynamic input filter units $163_1$ to $163_J$, and static input filter units $164_1$ to $164_J$, and series circuits including output packet bypass units $165_1$ to $165_J$, static output filter units $166_1$ to $166_J$, and dynamic output filter units $167_1$ to 167$_J$ are connected. A DHCP (Dynamic Host Configuration Protocol) processing unit 168 is connected to the input packet bypass units 162$_1$ to 162$_J$ and output packet bypass units 165$_1$ to 165$_J$. The first to Jth interface circuit units 161$_1$ to 161$_J$ in FIG. 5 collectively represent the circuit portion on a side of the bridge forwarder 135 close to the DSL subscriber line termination units 127$_1$ to 127$_J$ in FIG. 3.

The input packet bypass units 162$_1$ to 162$_J$ sort received packets into packets to be sent to the DHCP processing unit 168 and those to be sent to the dynamic input filter units 163$_1$ to 163$_J$. The dynamic input filter units 163$_1$ to 163$_J$ filter the received packets by using dynamic address information which changes over time. To the contrary, the static input filter units 164$_1$ to 164$_J$ further filter the received packets by using static address information which does not change over time. The static output filter units 166$_1$ to 166$_J$ statically filter packets to be sent in the direction of user terminal by using static address information. The dynamic output filter units 167$_1$ to 167$_J$ dynamically filter the packets to be sent. Each of the output packet bypass units 165$_1$ to 165$_J$ gives the packets sent from the static output filter units 166$_1$ to 166$_J$ or the packets output from the DHCP processing unit 168 to a corresponding one of the first to Jth interface circuit units 161$_1$ to 161$_J$ so that the packets are sent to a corresponding user terminal.

<Filtering Processing>

Table 1 shows part of a dynamic output management table 171 incorporated in the dynamic output filter units 167$_1$ to 167$_J$. The dynamic output management table 171 lists IP addresses, MAC addresses, and subscriber line numbers assigned to the respective user terminals.

TABLE 1

Dynamic Output Management Table 171

| IP Address | MAC Address | Subscriber Line Number |
|---|---|---|
| 192.1.1.2 | 00:00:4C:35:27:A6 | 1/3 |
| 192.1.1.10 | 00:00:4C:8B:39:C2 | 1/24 |
| 192.1.1.18 | 00:00:4C:D3:9A:72 | 7/10 |
| . | . | . |
| . | . | . |
| . | . | . |

The user (DHCP client) of each subscriber terminal can be assigned an IP address ensured on the DHCP server side in advance by requesting an IP address of the DHCP server. At this time, the DHCP processing unit 168 shown in FIG. 5 can acquire the assigned IP address and the MAC address and subscriber line number related to the user terminal. Hence, the DHCP processing unit 168 functions as an address information acquisition unit which successively acquires an IP address, MAC address, and subscriber line number assigned to a user terminal as address information.

Figure 6:
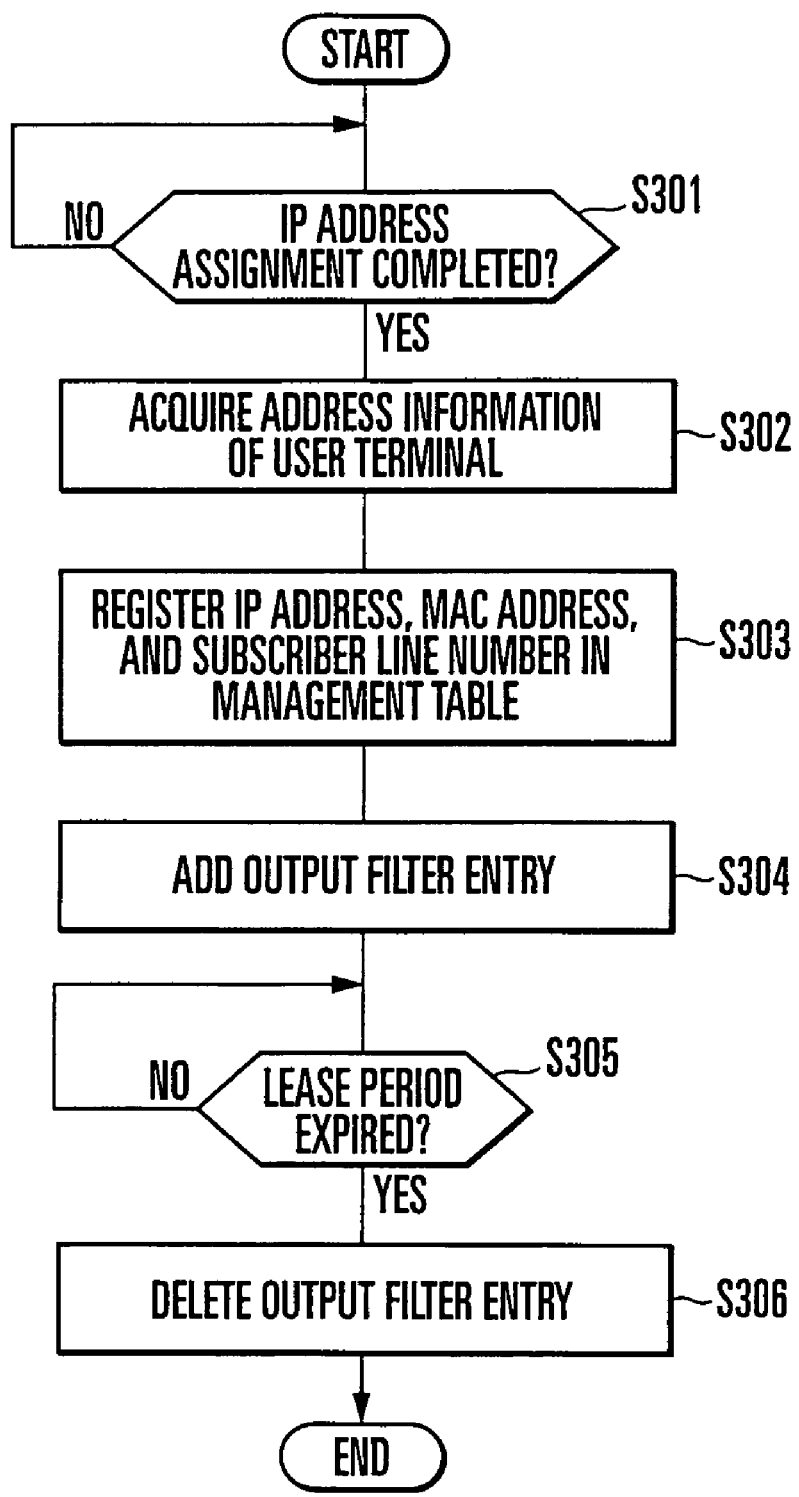
FIG. 6 is a flowchart showing dynamic output management table update processing by a DHCP processing unit.

FIG. 6 shows update processing of the dynamic output management table 171 by the DHCP processing unit 168. Every time assignment by the DHCP server based on an IP address assignment request is completed (YES in step S301), the DHCP processing unit 168 acquires the address information of the user terminal (step S302). The IP address, MAC address, and subscriber line number as the acquired address information are registered in the dynamic output management table 171 shown in Table 1 (step S303). An output filter entry to filter the contents is added (step S304).

The DHCP server sets a lease period for an IP address assigned to each user terminal. Hence, the period until the lease period is expired is successively checked for each IP address (step S305). If the lease period is expired (YES), the output filter entry is deleted (step S306). This aims at permitting packet sending only during the lease period.

Figure 7:
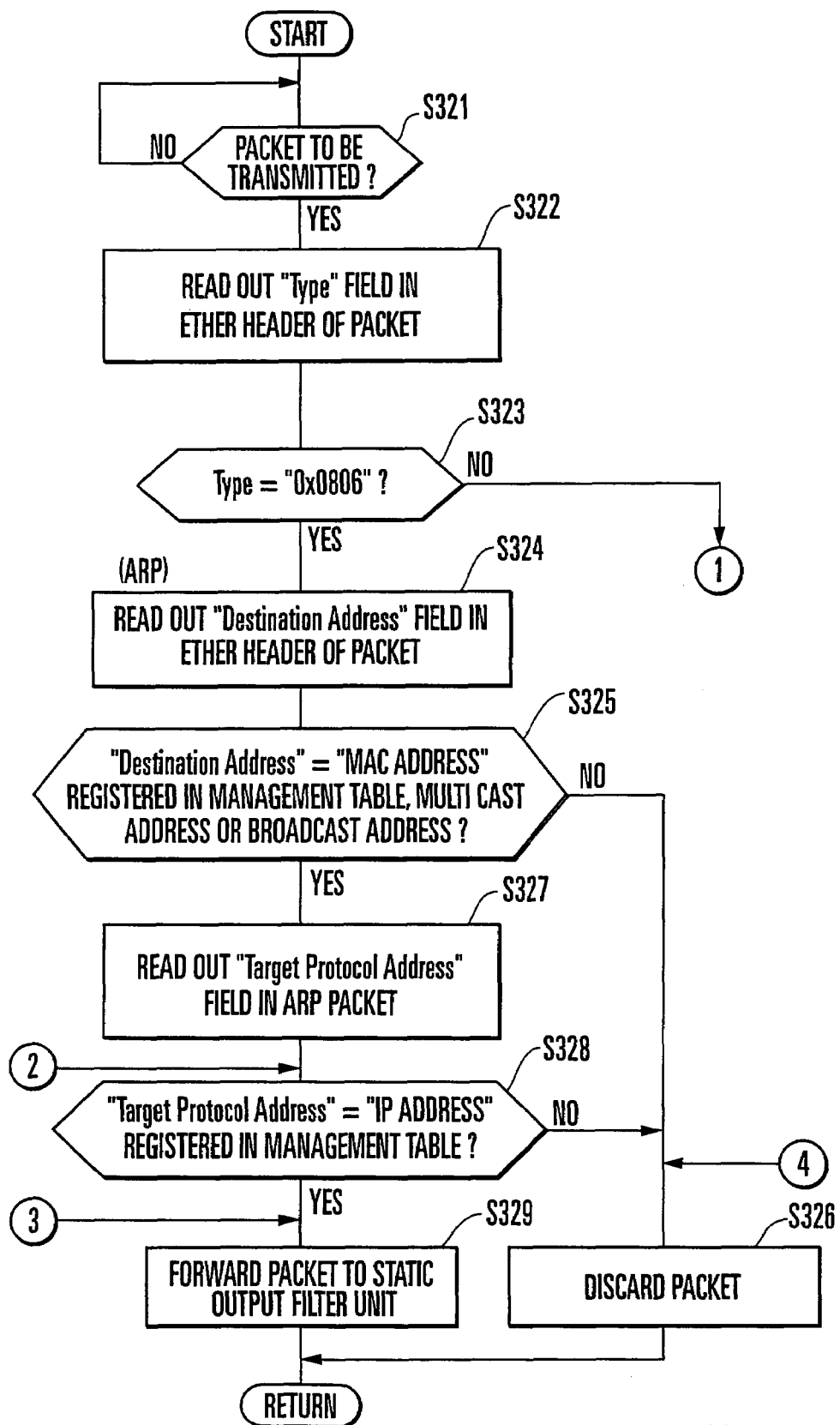
FIG. 7 is a flowchart showing the first half of packet sending control by dynamic output filter units.
Figure 8:
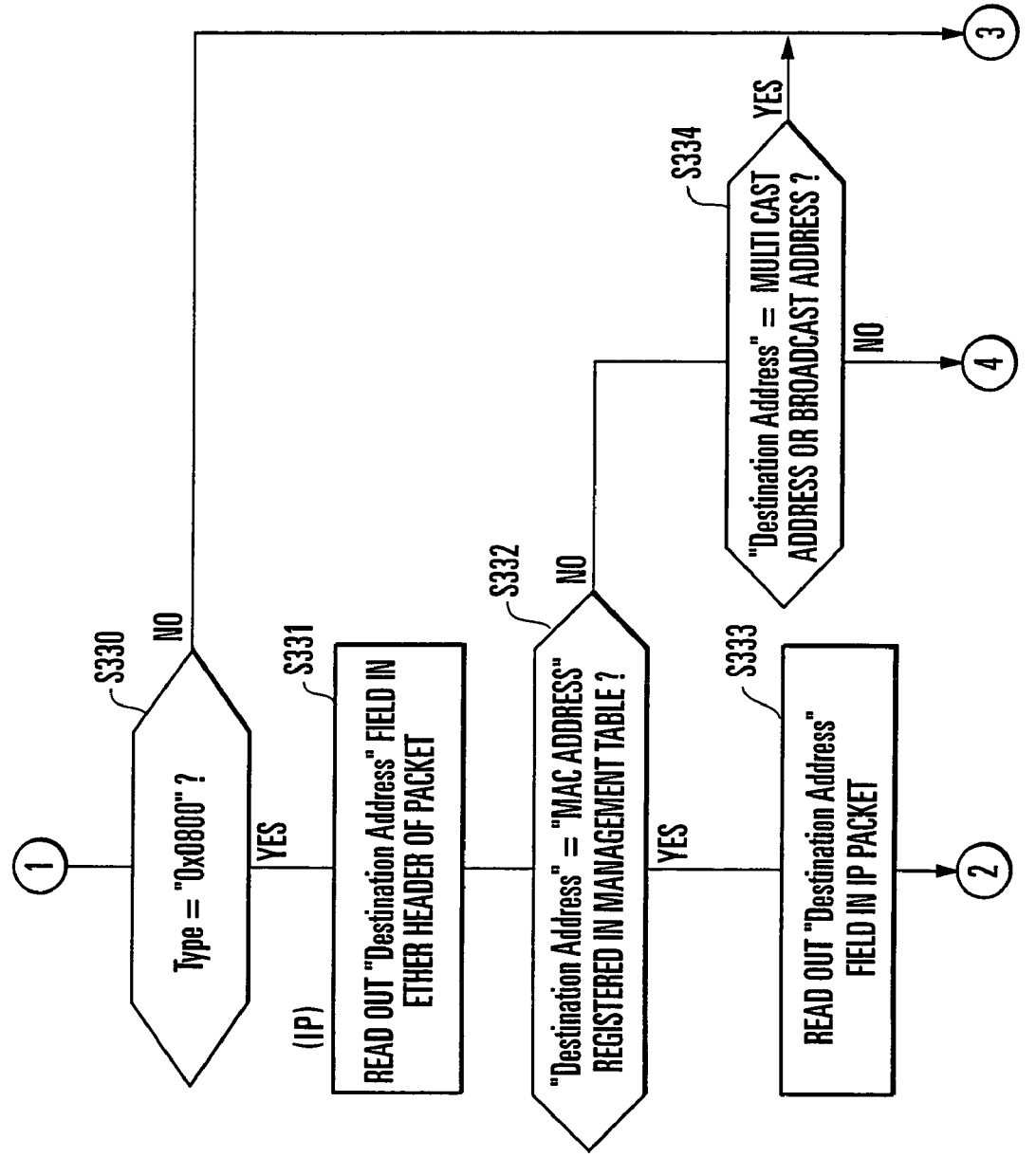
FIG. 8 is a flowchart showing the second half of packet sending control by dynamic output filter units.

FIGS. 7 and 8 show packet sending control by the dynamic output filter units 167$_1$ to 167$_J$. This processing is executed by causing the device control CPU 141 in the integrated gateway unit 131 shown in FIG. 4 to execute a predetermined control program. The same control logic as in FIGS. 7 and 8 can also be implemented by hardware.

The device control CPU 141 monitors arrival of a packet to be transmitted to a corresponding user terminal (step S321 in FIG. 7). When such a packet is sent from the up-link line 130 or the static input filter units 164$_1$ to 164$_J$ shown in FIG. 5 to the bridge forwarder 135 shown in FIG. 5 (YES), information in the "Type" field in the Ether (Ethernet (registered trademark)) header of the packet is read out (step S322). If the information is "0×0806", it is determined that the packet to be sent is an ARP (Address Resolution Protocol) packet (YES in step S323).

The ARP packet will be explained here. In communication on the Ethernet (registered trademark), even when an IP address is used in the communication of upper level, communication using a MAC address is executed eventually. ARP is used to acquire a MAC address. In ARP, a party "A" who wants to know a MAC address sets, in an ARP request packet, a known IP address corresponding to the MAC address and broadcasts the ARP packet to all nodes on the same network. A party "B" assigned the MAC address sets the MAC address in an ARP response packet and returns it to "A". "A" can know the target MAC address by receiving the ARP response packet.

A third party can acquire the MAC address from the IP address because of the presence of the ARP packet (ARP request packet or ARP response packet) serving as an associated address analysis packet to be used to analyze an absolute address corresponding to a designated dynamic address. That is, when an ARP packet of another person is captured (monitored), the set of the IP address and MAC address can also be known. Hence, illicit access can be done more easily.

If it is determined that the packet to be sent to an ARP packet (YES in step S323), the "Destination Address" field in the Ether header of the packet is read out (step S324). It is checked whether the destination address coincides with the "MAC address" registered in the dynamic output management table 171, or a multicast address or broadcast address (step S325). If the addresses do not coincide (NO), the destination user terminal is not present. Hence, the packet is discarded by a corresponding one of the dynamic output filter units 167$_1$ to 167$_J$ (step S326).

If an identical address is present in the dynamic output management table 171 in step S325 (YES), the "Target Protocol Address" field of the packet is read out (step S327). It is checked whether the target protocol address coincides with the "IP address" registered in the dynamic output management table 171 (step S328). If the addresses coincide (YES), the packet is sent to a corresponding one of the static output filter units 166$_1$ to 166$_J$ and subjected to static filtering as before (step S329). If the addresses do not coincide (NO in step S328), the packet is discarded by a corresponding one of the dynamic output filter units 167$_1$ to 167$_J$ (step S326).

FIG. 8 shows processing executed when the "Type" field in the Ether header is not "0×0806" in step S323 in FIG. 7 (NO), i.e., the packet to be sent is no ARP packet. In this case, it is checked whether the "Type" field is "0×0800" (step S330 in FIG. 8). If the "Type" field is "0×0800", the packet is an IP packet. In this case (YES), "Destination Address" in the Ether header of the packet to be transmitted is read out (step S331). It is checked whether the destination address coincides with the "MAC address" registered in the dynamic output management table 171 (step S332). If the addresses coincide (YES), "Destination Address" of the IP packet is read out again. Alternatively, the readout address is checked (step S333) to check whether the address coincides with the "IP address" registered in the dynamic output management table 171 (step S328 in FIG. 7). This processing has already been described above.

If it is determined in step S332 in FIG. 8 that the address does not coincide with the "MAC address" (NO), it is checked whether the "Destination Address" in the Ether header coincides with the multicast address or broadcast address (step S334). If the addresses coincide (YES), the flow advances to step S329 in FIG. 7 to execute static filtering. Otherwise (NO in step S334 in FIG. 8), the packet is discarded by a corresponding one of the dynamic output filter units 167₁ to 167ⱼ (step S326 in FIG. 7).

If it is determined in step S330 in FIG. 8 that the "Type" field is not "0×0800" (NO), the packet is sent to a corresponding one of the static output filter units 166₁ to 166ⱼ. In this case, the packet to be sent is neither an ARP packet nor an IP packet. In this embodiment, processing of this packet is not executed by the dynamic output filter units 167₁ to 167ⱼ but by the static output filter units 166₁ to 166ⱼ (step S329 in FIG. 7). The static output filter units 166₁ to 166ⱼ, e.g., discard such a packet.

The packet sent to the static output filter units 166₁ to 166ⱼ undergoes necessary filtering, passes through a corresponding one of the first to Jth interface circuit units 161₁ to 161ⱼ from the output packet bypass units 165₁ to 165ⱼ, and is transmitted to the destination user terminal.

FIG. 9 shows main parts of the integrated gateway unit 131. The integrated gateway unit 131 comprises an address information acquisition unit 181, associated address analysis packet determination unit 182, packet information reading unit 183, address information coincidence presence/absence determination unit 184, and packet sending control unit 185.

The address information acquisition unit 181 successively acquires, from a DHCP server 180 as address information, a set of an IP address assigned to a user terminal, and a MAC address and subscriber line number related to the user terminal. More specifically, the address information acquisition unit 181 executes the operation in steps S301 to S306 in FIG. 6.

The associated address analysis packet determination unit 182 determines whether a packet to be sent to a user terminal is an associated address analysis packet such as an ARP packet or an IP packet and outputs the determination result to the address information coincidence presence/absence determination unit 184 and packet sending control unit 185. More specifically, the associated address analysis packet determination unit 182 executes the operation in steps S322 and S323 in FIG. 7 and step S330 in FIG. 8.

The packet information reading unit 183 reads out, from the packet, packet information containing a set of a MAC address, IP address, and subscriber line number and indicating the address of the packet. More specifically, the packet information reading unit 183 executes the operation in steps S324 and S327 in FIG. 7 and steps S331 and S333 in FIG. 8.

The address information coincidence presence/absence determination unit 184 determines whether the set of the MAC address, IP address, and subscriber line number read out by the packet information reading unit 183 coincides with one of the address information acquired by the address information acquisition unit 181. At this time, processing corresponding to the determination result by the associated address analysis packet determination unit 182 is executed. More specifically, the address information coincidence presence/absence determination unit 184 executes the operation in steps S325 and S328 in FIG. 7 and step S332 in FIG. 8.

The packet sending control unit 185 permits to send only a packet determined to be coincident by the address information coincidence presence/absence determination unit 184 to the user terminal. At this time, processing corresponding to the determination result by the associated address analysis packet determination unit 182 is executed. More specifically, the packet sending control unit 185 executes the operation in steps S326 and S329 in FIG. 7.

As described above, a set of an IP address assigned to a user terminal, and a MAC address and subscriber line number related to the user terminal is successively acquired as address information. In sending a packet to the user terminal, packet information containing an IP address, MAC address, and subscriber line number is read out from the packet. Only when the packet information coincides with one of the address information, sending of the packet is permitted. With this arrangement, a packet to a communication terminal where the combination of the IP address, MAC address, and subscriber line number is not present can be prevented from being sent from the subscriber line accommodation apparatus 102.

The DHCP server 180 may exist in the subscriber line accommodation apparatus 102.

In the above description, the DHCP processing unit 168 exists in the subscriber line accommodation apparatus 102, and the dynamic output management table 171 is created on the basis of address information such as an IP address acquired by the DHCP processing unit 168. However, the present invention is not limited to this. For example, the DHCP processing unit 168 or DHCP server 180 may independently exist outside the subscriber line accommodation apparatus 102. Instead, a DHCP relay agent which entrusts the DHCP processing unit 168 or DHCP server 180 with processing and acquires necessary information by communicating with them may be arranged in the subscriber line accommodation apparatus 102. In this case, the DHCP relay agent functions as the address information acquisition unit. The dynamic output management table 171 is created on the basis of address information acquired through the DHCP relay agent.

Even when no DHCP relay agent is present in the subscriber line accommodation apparatus 102, a packet itself which transmits address information flows in the subscriber line accommodation apparatus 102 comprising the subscriber line termination units to individually terminate the plurality of subscriber lines 103₁ to 103M if DHCP processing is executed. When a spoofing unit to spoof the address information is arranged in the subscriber line accommodation apparatus 102, the dynamic output management table 171 can be created in the same way as described above. In this case, the spoofing unit functions as the address information acquisition unit.

In the above-described embodiment, a DSL line has been exemplified as the subscriber line. However, the present invention is not limited to this, and any other subscriber line connected to a subscriber line termination unit can be used. For example, the present invention can also be applied to a line using an optical fiber cable.

In the embodiment, a set of an IP address, MAC address, and subscriber line number is checked as a filter condition. A pair including only an IP address and MAC address or only an IP address may be checked. Regardless of the name such as "MAC address" or "IP address", an absolute address uniquely assigned to a communication terminal or a dynamic address dynamically assigned to the absolute address may be used to impart the function of an output filter.

In the embodiment, filtering of a packet to be sent is done by collation with the contents registered in the dynamic output management table 171 The present invention can also be applied even when the same filtering is executed without providing any specific table.

As described above, in the present invention, the subscriber line accommodation apparatus grasps the dynamic address dynamically assigned to a communication terminal connected to each subscriber line terminated by a subscriber line termination unit. A packet is sent to the communication terminal on the basis of a sending condition whether a dynamic address coincides with the destination of the packet. For this reason, even sending of a packet from a third party who has acquired an absolute address such as a MAC address can be rejected if the dynamic address does not coincide. Hence, an increase in traffic caused by sending a packet without destination can be prevented.

What is claimed is:

1. A subscriber line accommodation apparatus characterized by comprising:
    subscriber line termination units which individually terminate a plurality of subscriber lines;
    an address information acquisition unit which successively acquires, as address information, a dynamic address dynamically assigned to each of communication terminals connected to the subscriber lines terminated by said subscriber line termination units;
    a packet information reading unit which reads out, from a packet to be sent to one of the communication terminals, packet information containing a dynamic address indicating a destination of the packet;
    an address information coincidence presence/absence determination Unit which determines whether the dynamic address read out by said packet information reading unit coincides with one of pieces of address information acquired by said address information acquisition unit; and a packet sending control unit which permits sending of only a packet determined to be coincident by said address information coincidence presence/absence determination unit;
    wherein said address information acquisition unit successively acquires, as the address information, a set of an absolute address uniquely assigned to the communication terminal and a dynamic address dynamically assigned to the absolute address,
    the packet information reading unit reads out, from the packet to be sent to one of the communication terminals, packet information containing the set of the absolute address and the dynamic address and indicating the destination of the packet, and
    said address information coincidence presence/absence determination unit determines whether the set of the absolute address and the dynamic address read out by said packet information reading unit coincides with one of pieces of address information acquired by said address information acquisition unit;
    wherein said address information acquisition unit successively acquires, as the address information, a set of an absolute address uniquely assigned to the communication terminal, a dynamic address dynamically assigned to the absolute address, and a subscriber line number related to the subscriber line which has acquired the dynamic address,
    the packet information reading unit reads out, from the packet to be sent to one of the communication terminals, packet information containing the set of the absolute address, the dynamic address, and the subscriber line number and indicating the destination of the packet, and
    said address information coincidence presence/absence determination unit determines whether the set of the absolute address, the dynamic address, and the subscriber line number read out by said packet information reading unit coincides with one of nieces of address information acquired by said address information acquisition unit.

2. An apparatus according to claim 1, further comprising an associated address analysis packet determination unit which determines whether the packet to be sent to one of the communication terminals is an associated address analysis packet to be used to analyze an absolute address corresponding to a designated dynamic address,
    wherein said packet information reading unit reads out the packet information from a packet determined as the associated address analysis packet by said associated address analysis packet determination unit.

3. An apparatus according to claim 1, wherein the dynamic address is an IP (Internet Protocol) address.

4. An apparatus according to claim 1, wherein the absolute address is a MAC (Media Access Control) address.

5. An apparatus according to claim 2, wherein the associated address analysis packet is an ARP (Address Resolution Protocol) packet.

6. An apparatus according to claim 5, wherein the ARP packet is one of an ARP request packet and an ARP response packet.

7. An apparatus according to claim 1, wherein the subscriber line is a DSL (Digital Subscriber Line) line.

8. An apparatus according to claim 1, wherein the subscriber line is a line using an optical fiber cable.

9. An apparatus according to claim 5, further comprising a DHCP (Dynamic Host Configuration Protocol) server which assigns the dynamic address.

10. An apparatus according to claim 9, wherein said address information acquisition unit acquires the assigned dynamic address from said DHCP server.

11. An apparatus according to claim 5, wherein said address information acquisition unit comprises a DHCP (Dynamic Host Configuration Protocol) relay agent which is provided outside the apparatus and entrusts said DHCP server to assign the dynamic address with processing.

12. An apparatus according to claim 5, wherein said address information acquisition unit comprises a spoofing unit which spoofs the dynamic address assigned by a DHCP (Dynamic Host Configuration Protocol) server provided outside the apparatus.

13. A packet filtering method characterized by comprising the steps of:
    reading out, from a packet to be sent to one of communication terminals connected to subscriber line termination units which individually terminate a plurality of subscriber lines, packet information containing a dynamic address indicating a destination of the packet;
    determining whether the readout dynamic address coincides with one of dynamic addresses as addresses dynamically assigned to the communication terminals connected to the subscriber line termination units; and
    permitting sending of only a packet determined to be coincident;
    wherein in the reading step, packet information containing a set of an absolute address uniquely assigned to the communication terminal as the sending destination of the packet and a dynamic address dynamically assigned to the absolute address is read out, and in the determination step, it is determined whether the readout set of the absolute address and the dynamic address coincides with one of sets of absolute addresses and dynamic addresses of the communication terminals;

wherein in the reading step, packet information containing a set of an absolute address uniquely assigned to the communication terminal as the sending destination of the packet, a dynamic address dynamically assigned to the absolute address, and a subscriber line number related to the subscriber line which has acquired the dynamic address is read out, and in the determination step, it is determined whether the readout set of the absolute address, the dynamic address, and the subscriber line number coincides with one of sets of absolute addresses, dynamic addresses, and subscriber line numbers of the communication terminals.

14. A method according to claim 13, further comprising the step of determining whether the packet to be sent to one of the communication terminals is an associated address analysis packet to be used to analyze an absolute address corresponding to a designated dynamic address, wherein in the reading step, the packet information is read out from a packet determined as the associated address analysis packet.

* * * * *